US011015272B2

(12) United States Patent
Kajiyama et al.

(10) Patent No.: US 11,015,272 B2
(45) Date of Patent: May 25, 2021

(54) LAMINATED NONWOVEN FABRIC

(71) Applicant: TORAY INDUSTRIES, INC., Tokyo (JP)

(72) Inventors: Hiroshi Kajiyama, Otsu (JP); Taira Omori, Otsu (JP); Kenichi Sakai, Otsu (JP)

(73) Assignee: TORAY INDUSTRIES, INC, Tokyo (JP)

( * ) Notice: Subject to any disclaimer, the term of this patent is extended or adjusted under 35 U.S.C. 154(b) by 339 days.

(21) Appl. No.: 15/557,307

(22) PCT Filed: Mar. 10, 2016

(86) PCT No.: PCT/JP2016/057594
§ 371 (c)(1),
(2) Date: Sep. 11, 2017

(87) PCT Pub. No.: WO2016/143857
PCT Pub. Date: Sep. 15, 2016

(65) Prior Publication Data
US 2018/0051403 A1 Feb. 22, 2018

(30) Foreign Application Priority Data

Mar. 12, 2015 (JP) .............................. JP2015-049155

(51) Int. Cl.
| | |
|---|---|
| *D04H 1/4334* | (2012.01) |
| *B32B 5/26* | (2006.01) |
| *D04H 1/593* | (2012.01) |
| *B32B 5/02* | (2006.01) |
| *D04H 1/559* | (2012.01) |
| *B32B 7/12* | (2006.01) |
| *D04H 1/541* | (2012.01) |
| *D04H 1/4382* | (2012.01) |
| *G10K 11/168* | (2006.01) |
| *D04H 1/435* | (2012.01) |
| *G10K 11/162* | (2006.01) |
| *D04H 1/587* | (2012.01) |

(52) U.S. Cl.
CPC .......... *D04H 1/4334* (2013.01); *B32B 5/022* (2013.01); *B32B 5/024* (2013.01); *B32B 5/26* (2013.01); *B32B 7/12* (2013.01); *D04H 1/435* (2013.01); *D04H 1/4382* (2013.01); *D04H 1/541* (2013.01); *D04H 1/559* (2013.01); *D04H 1/587* (2013.01); *D04H 1/593* (2013.01); *G10K 11/162* (2013.01); *G10K 11/168* (2013.01); *B32B 2260/021* (2013.01); *B32B 2260/046* (2013.01); *B32B 2262/0253* (2013.01); *B32B 2262/0261* (2013.01); *B32B 2262/0284* (2013.01); *B32B 2307/10* (2013.01); *B32B 2307/102* (2013.01); *B32B 2307/304* (2013.01); *B32B 2307/3065* (2013.01); *B32B 2307/718* (2013.01); *B32B 2307/72* (2013.01); *B32B 2307/724* (2013.01); *B32B 2307/73* (2013.01); *B32B 2307/732* (2013.01); *B32B 2367/00* (2013.01); *B32B 2377/00* (2013.01); *B32B 2419/00* (2013.01); *B32B 2457/00* (2013.01); *B32B 2605/08* (2013.01); *D10B 2331/02* (2013.01); *D10B 2331/04* (2013.01); *D10B 2401/041* (2013.01)

(58) Field of Classification Search
CPC .......... B32B 2307/102; B32B 2307/72; B32B 2307/724; B32B 2367/00; B32B 2377/00; B32B 5/022; B32B 5/26; D04H 1/4334; D04H 1/435; D04H 1/4374; D04H 1/4382; D04H 1/465; D04H 1/542; D04H 1/587; D10B 2331/02; D10B 2331/04; D10B 2401/041; G10K 11/162; G10K 11/168
See application file for complete search history.

(56) References Cited

U.S. PATENT DOCUMENTS

| | | | | |
|---|---|---|---|---|
| 7,294,215 | B2 * | 11/2007 | Tsuyama | ............. B21B 45/0218 148/637 |
| 7,694,779 | B2 * | 4/2010 | Takayasu | ............. G10K 11/162 181/286 |
| 7,837,009 | B2 * | 11/2010 | Gross | ..................... B32B 27/12 181/208 |
| 2006/0225952 | A1 | 10/2006 | Takayasu et al. | |
| 2008/0173497 | A1 | 7/2008 | Kalinova et al. | |

(Continued)

FOREIGN PATENT DOCUMENTS

| | | |
|---|---|---|
| CN | 101189381 A | 5/2008 |
| JP | 10207469 A | 8/1998 |
| JP | H10207469 A | 8/1998 |

(Continued)

OTHER PUBLICATIONS

Extended European Search Report for European Application No. 16 761 823.0, dated Oct. 4, 2018, 7 pages.

(Continued)

*Primary Examiner* — Arti Singh-Pandey
(74) *Attorney, Agent, or Firm* — Ratnerprestia

(57) ABSTRACT

There is provided a laminated nonwoven fabric having excellent sound absorbing performance in a low frequency range, the laminated nonwoven fabric having a skin layer and a base material layer, the skin layer having a nonwoven fabric A, the nonwoven fabric A having a density of 100 to 500 kg/m$^3$, a thickness of 0.5 to 2.5 mm, and an air permeability of 4 to 40 cm$^3$/cm$^2$/s; and the base material layer having a nonwoven fabric B, the nonwoven fabric B having a basis weight of 200 to 500 g/m$^2$ and a thickness of 5 to 40 mm.

8 Claims, No Drawings

(56) References Cited

U.S. PATENT DOCUMENTS

2011/0293911 A1* 12/2011 Coates .................. B32B 5/26
428/220

FOREIGN PATENT DOCUMENTS

| JP | 10247085 A | 9/1998 |
| JP | H10247085 A | 9/1998 |
| JP | 2007039826 A | 2/2007 |
| JP | 2009000843 A | 1/2009 |
| JP | 2010102236 A | 5/2010 |
| JP | 2011017104 A | 1/2011 |
| JP | 2013147771 A | 8/2013 |
| JP | 2013163869 A | 8/2013 |
| JP | 2015030218 A | 2/2015 |
| WO | 2005019783 A1 | 3/2005 |

OTHER PUBLICATIONS

Written Opinion of the International Search Authority for International Application No. PCT/JP2016/057594, dated Jun. 7, 2016, 8 pages.
International Search Report and Written Opinion for International Application No. PCT/JP2016/057594, dated Jun. 7, 2016—7 Pages.
Second Chinese Office Action for Chinese Application No. 201680014511.6, dated May 29, 2019, with translation, 15 pages.

* cited by examiner

LAMINATED NONWOVEN FABRIC

CROSS REFERENCE TO RELATED APPLICATIONS

This is the U.S. National Phase application of PCT/JP2016/057594, filed Mar. 10, 2016, which claims priority to Japanese Patent Application No. 2015-049155, filed Mar. 12, 2015, the disclosures of each of these applications being incorporated herein by reference in their entireties for all purposes.

FIELD OF THE INVENTION

The present invention relates to a laminated nonwoven fabric, in particular, a nonwoven fabric excellent in sound absorbing properties.

BACKGROUND OF THE INVENTION

Nonwoven fabrics are used for purposes of sound absorption properties and heat insulation for automobiles or electrical products. In particular, as for automobiles, lightweight and thin nonwoven fabrics are required in order to improve fuel efficiency.

Patent Document 1 discloses a sound absorbing material made of a laminated nonwoven fabric including a nonwoven fabric layer composed of nanofibers as a surface layer and a base portion composed of fibers having larger single fiber diameter than nanofibers.

Patent Document 2 discloses a sound absorbing material made of a surface material including a laminated nonwoven fabric of polyester based fiber and of mainly a recovered wool felt.

PATENT DOCUMENTS

Patent Document 1: Japanese Patent Laid-open Publication No. 2015-30218
Patent Document 2: Japanese Patent Laid-open Publication No. 2013-163869

SUMMARY OF THE INVENTION

The sound absorbing material described in Patent Document 1 has been described as having a sound absorption coefficient at 2000 Hz in a high frequency range of 85% or more. The sound absorbing material described in Patent Document 2 has also been described as having a sound absorption coefficient at frequencies of 2000 to 5000 Hz of 40% or more. Sound absorption properties in a low frequency range (from 800 to 1250 Hz) have, however, been required. Therefore, an object of the present invention is to provide a laminated nonwoven fabric having excellent sound absorption performance in the low frequency range.

As a result of intensive studies in view of solving the above-mentioned problem, the present inventors have developed the following invention.

(1) A laminated nonwoven fabric having a skin layer and a base material layer,
the skin layer having a nonwoven fabric A, the nonwoven fabric A having a density of 100 to 500 kg/m$^3$, a thickness of 0.5 to 2.5 mm, and an air permeability of 4 to 40 cm$^3$/cm$^2$/s; and
the base material layer having a nonwoven fabric B, the nonwoven fabric B having a basis weight of 200 to 500 g/m$^2$ and a thickness of 5 to 40 mm.

Further, there are the following preferred embodiments.

(2) The laminated nonwoven fabric described in (1), in which the nonwoven fabric B has a thickness of 10 to 40 mm.

(3) The laminated nonwoven fabric described in (1) or (2), in which the nonwoven fabric A contains 20 to 40% by mass of a thermoplastic fiber having a single fiber diameter of 1 to 5000 nm, relative to the whole nonwoven fabric A.

(4) The laminated nonwoven fabric described in any one of (1) to (3), having a bending resistance of 300 mm or less.

(5) The laminated nonwoven fabric described in any one of (1) to (4), in which the nonwoven fabric A has fibers made of polyamide and/or fibers made of polyethylene terephthalate.

(6) The laminated nonwoven fabric described in any one of (1) to (5), in which the nonwoven fabric B has a binder fiber and the content of the binder fiber is 5 to 30% by mass relative to the whole nonwoven fabric B.

(7) A sound absorbing material having the laminated nonwoven fabric described in any one of (1) to (6).

The present invention provides a laminated nonwoven fabric having excellent sound absorption properties in a low frequency range. Further, a preferred embodiment of the present invention provides a laminated nonwoven fabric having high flexibility.

DETAILED DESCRIPTION OF EMBODIMENTS OF THE INVENTION

An embodiment of the present invention will be described hereinbelow in detail.

The laminated nonwoven fabric of an embodiment of the present invention has a skin layer and a base material layer, the skin layer has a nonwoven fabric A, the nonwoven fabric A having a density of 100 to 500 kg/m$^3$, a thickness of 0.5 to 2.5 mm, and an air permeability of 4 to 40 cm$^3$/cm$^2$/s; and the base material layer has a nonwoven fabric B, the nonwoven fabric B having a basis weight of 200 to 500 g/m$^2$ and a thickness of 5 to 40 mm.

That is, the laminated nonwoven fabric of an embodiment of the present invention provides excellent sound absorption properties in the range of 800 to 1250 Hz by laminating at least nonwoven fabric A that the skin layer has and nonwoven fabric B that the base material layer has.

Here, it is necessary that nonwoven fabric A has a density of 100 to 500 kg/m$^3$. When the density is 100 kg/m$^3$ or more, sound causes the skin layer to resonate, which causes so-called panel vibration, so that the sound absorption coefficient in a low frequency range increases. On the other hand, when the density is 500 kg/m$^3$ or less, the skin layer has a specific flexibility. From the above viewpoints, nonwoven fabric A has a density of preferably 150 kg/m$^3$ or more and 300 kg/m$^3$ or less.

Nonwoven fabric A preferably has a thickness of 0.5 to 2.5 mm. When the thickness is within the above range, the skin layer becomes excellent in flexibility. From the above viewpoint, the lower limit of the thickness is preferably 0.6 mm and the upper limit thereof is preferably 1.6 mm or less.

Further, it is necessary that nonwoven fabric A has an air permeability of 4 to 40 cm$^3$/cm$^2$/s. The "air permeability" herein is measured in accordance with JIS L1096-1999 8.27.1 A method (Frazier method) as described in the section of Examples. When the air permeability is 4 cm$^3$/cm$^2$/s or more, sound passes through voids between fibers at a constant flow rate, and at that time, the sound can be efficiently converted into heat due to air friction against fiber materials around the voids. In addition, nonwoven fabric A allows sound to pass through the inside of the laminated nonwoven fabric without reflecting sound in a high frequency range. On the other hand, when the air permeability is 40 cm$^3$/cm$^2$/s or less, the sound absorption coefficient in a low frequency range can be increased. From the above viewpoints, nonwoven fabric A has an air permeability of preferably 10 cm$^3$/cm$^2$/s or more and 30 cm$^3$/cm$^2$/s or less.

Nonwoven fabric A preferably has a certain range of pore distribution in order to increase energy loss due to air friction. It is preferable that nonwoven fabric A has a pore diameter dispersion degree of 1 to 20 in the range of the fine pore size distribution frequency exceeding 0 to 10 nm or less, and a pore diameter dispersion degree of 15 to 60 in the range of 10 to 20 nm.

Nonwoven fabric A has a basis weight of preferably 100 to 400 g/m$^2$, more preferably 130 g/m$^2$ or more, and even more preferably 150 g/m$^2$ or more.

As a material that constitutes nonwoven fabric A, thermoplastic resin having excellent heat resistance is preferable, and in view of ease of availability and productivity, nonwoven fabric A preferably contains fibers made of polyamide and/or fibers made of polyethylene terephthalate. The fibers made of polyamide herein may be fibers made of polyamide alone or may contain a component except polyamide as an additive or the like as long as an effect of the present invention is not impaired. Further, the fibers made of polyethylene terephthalate may also be made of polyethylene terephthalate alone or may contain a component except polyethylene terephthalate as long as an effect of the present invention is not impaired.

Nonwoven fabric A is preferable because a staple fiber nonwoven fabric obtained by a needle punch method or a spun lace method can easily control density, thickness, and air permeability.

Nonwoven fabric A preferably contains 20 to 40% by mass of a thermoplastic fiber (this fiber may hereinafter be referred to as nanofiber) having a single fiber diameter of 1 to 5000 nm made of thermoplastic resin, relative to the whole nonwoven fabric A. When the thermoplastic fiber is 20% by mass or more, the number of constituting fibers in nonwoven fabric A can be increased, and as a result of this, it becomes easy to control the density or air permeability of nonwoven fabric A. The thermoplastic fiber has a number average single fiber diameter of preferably 150 nm or more, more preferably 2000 nm or less, and even more preferably 700 nm or less.

Nonwoven fabric A may be composed of 100% nanofibers; constituted by blending of a nanofiber and a fiber thicker than the nanofiber (i.e., a fiber having a single fiber diameter exceeding 5000 nm); or constituted by laminating a nanofiber layer and a layer of fibers thicker than nanofibers. Nonwoven fabric A may be more preferably constituted by laminating a nanofiber layer and a layer of fibers thicker than nanofibers.

In addition, nonwoven fabric A may be constituted by preparing a plurality of nonwoven fabrics in which a nanofiber layer and a layer of fibers thicker than nanofibers are laminated and then bonding the nonwoven fabrics to each other using a low-melting point powder or the like.

The nanofibers in the present invention may be those having various forms such as finely dispersed single fibers; partially bound single fibers; a plurality of single fiber aggregates (e.g., bundles), or the like. That is, the nanofiber may be in the form of a fiber, and not limited to length or cross-sectional shape of the fiber.

To obtain a nanofiber, the following method is exemplified: A polymer alloy molten body composed of an easily soluble polymer as a sea (matrix) and a hardly soluble polymer as an island (domain) is prepared from two or more polymers having different solubility in a solvent, the polymer alloy molten body is spun and thereafter solidified by cooling to form a fiber. The fiber thus formed is subjected to drawing and/or heat treatment as needed to obtain a polymer alloy fiber and thereafter, a nonwoven fabric is prepared from such fiber. Then, the easily soluble polymer is removed by a solvent, so that a nanofiber can be obtained.

Alternatively, a fiber containing polyamide and polyethylene terephthalate which have poor compatibility therein is formed into a nonwoven fabric, and the nonwoven fabric thus formed is subjected to needle punching or water jet punching to be split into the polyamide and the polyethylene terephthalate, so that a nanofiber is formed.

The skin layer may also have other sheet-like article in addition to nonwoven fabric A as long as an effect of the present invention is not impaired.

Next, nonwoven fabric B will be described. Nonwoven fabric B has a basis weight of 200 to 500 g/m$^2$. When the basis weight is 200 g/m$^2$ or more, a porous laminated nonwoven fabric having continuous pores is obtained. Further, when the basis weight is 500 g/m$^2$ or less, a nonwoven fabric having lightweight and flexibility is obtained. As a result, the nonwoven fabric has good followability when the laminated nonwoven fabric is bonded to an uneven portion, which in turn is excellent in workability.

Nonwoven fabric B has a thickness of 5 to 40 mm. When the thickness is 5 mm or more, a layer having a certain thickness and containing air is generated under the skin layer, and such air-containing layer and the skin layer cause Helmholtz resonance to thereby achieve sound absorption in a low frequency range. And, since nonwoven fabric B is porous with continuous pores, sound absorption properties in a high frequency range are improved. According to the above mechanism, nonwoven fabric B has a thickness of preferably 10 mm or more, and more preferably 12 mm or more, from the viewpoint of further improving sound absorption properties in a high frequency range as well as a low frequency range. Further, the thickness of 40 mm or less improves working efficiency at the time of mounting the nonwoven fabric in a void in automobiles or the like. The upper limit of the thickness of nonwoven fabric B is preferably 30 mm or less.

Nonwoven fabric B preferably contains a thermoplastic fiber from the viewpoints of productivity and uniformity in heat insulation performance. It is also preferable that the above-mentioned nonwoven fabric B further contains a thermoplastic binder fiber.

As the thermoplastic fiber contained in the above-mentioned nonwoven fabric B, polyethylene terephthalate fiber, polyamide-6 fiber, polypropylene fiber may be used. Of these, polyethylene terephthalate fiber is preferable from the viewpoints of excellent hydrophobicity or heat resistance and of contributing to improvement in durability or flame retardancy.

In order to enhance flame retardancy of the laminated nonwoven fabric, a flame retardant polyester fiber which is flame retardant material may be used as the fiber contained in nonwoven fabric B.

Nonwoven fabric B preferably contains 5 to 40% by mass of a thermoplastic fiber having a single yarn fineness of 1.0 dtex or less, relative to the whole nonwoven fabric B. When nonwoven fabric B contains 5% by mass or more of the thermoplastic fiber having a single yarn fineness of 1.0 dtex or less, relative to the whole nonwoven fabric B, the sound absorption performance can be further enhanced. On the other hand, when nonwoven fabric B contains 40% by mass or less of the thermoplastic fiber having a single yarn fineness of 1.0 dtex or less, relative to the whole nonwoven fabric B, the ratio of the thermoplastic fiber having a low fineness can be kept low, so that passability through the carding step at the time of preparing nonwoven fabric B is further improved and productivity becomes more excellent. Nonwoven fabric B contains more preferably 10% by mass or more of the thermoplastic fiber having a single yarn fineness of 1.0 dtex or less, relative to the whole nonwoven fabric B, and more preferably 30% by mass or less of the thermoplastic fiber having a single yarn fineness of 1.0 dtex or less, relative to the whole nonwoven fabric B.

In order to improve air retention performance of nonwoven fabric B to enhance sound absorption performance of the laminated nonwoven fabric, nonwoven fabric B preferably contains 5 to 30% by mass of a thermoplastic fiber having a hollow structure, relative to the whole nonwoven fabric B. When nonwoven fabric B contains 5% by mass or more of the thermoplastic fiber having a hollow structure, relative to the whole nonwoven fabric B, the air retention performance of nonwoven fabric B further improves and the sound absorption performance of the laminated nonwoven fabric even further improves. When nonwoven fabric B contains 30% by mass or less of the thermoplastic fiber having a hollow structure, relative to the whole nonwoven fabric B, the ratio of the hollow fiber can be kept low, so that the laminated nonwoven fabric maintains excellent heat insulation performance. Also, the laminated nonwoven fabric can avoid becoming bulky. Therefore, nonwoven fabric B contains more preferably 10% by mass or more, and more preferably 25% by mass or less of the thermoplastic fiber having a hollow structure, relative to the whole nonwoven fabric B.

As the structure of the thermoplastic binder fiber to be contained in nonwoven fabric B, a core-sheath structure having a core part of polyethylene terephthalate and a sheath part of a binder component is preferable from the viewpoint that the heat shrinkage of the nonwoven fabric can be suppressed.

As the binder component, though not particularly limited, a copolymer polyester composed of terephthalic acid or an ester forming derivative thereof; isophthalic acid or an ester forming derivative thereof; a lower alkylene glycol; and polyalkylene glycol and/or a monoether thereof may be preferably used.

The thermoplastic binder fiber preferably contains 5 to 30% by mass relative to the whole nonwoven fabric B. When the content of the binder fiber is 5% by mass or more, the thermoplastic fibers can be sufficiently adhered to each other, allowing nonwoven fabric B to have at least a specific bending resistance. On the other hand, when the content of the binder fiber is 30% by mass or less, nonwoven fabric B can be prevented from being hardened due to excessively strong adhesion between the thermoplastic fibers, and a laminated nonwoven fabric having more excellent flexibility can be obtained.

Further, the thermoplastic fiber contained in nonwoven fabric B is preferably crimped. This makes nonwoven fabric B bulky, which allows to obtain a laminated nonwoven fabric excellent in sound absorption performance or shape retention property. In the carding method, the thermoplastic fiber is firmly caught on a needle, uniformly dispersed and densely intertwined with other fibers, so that nonwoven fabric B can be obtained at high yield.

The number-average fiber length of the thermoplastic fiber used in nonwoven fabric B is preferably in the range of 10 to 90 mm. By binding the thermoplastic fiber having an average fiber length of 10 mm or more with the binder fiber, the bending resistance of nonwoven fabric B becomes more excellent, so that nonwoven fabric B having more excellent shape retention property can be obtained. On the other hand, when the average fiber length of thermoplastic fiber is 90 mm or less, the thermoplastic fiber and the binder fiber are uniformly dispersed and densely intertwined with each other to give a laminated nonwoven fabric allowing to have fine voids and having excellent sound absorption performance, in the step of producing nonwoven fabric B including the thermoplastic fiber and the binder fiber, that is, the step of dispersing fibers by the carding method or the air laid method.

The method of producing nonwoven fabric B is exemplified by the following method. A thermoplastic fiber, or a mixed fiber of a thermoplastic binder fiber and a thermoplastic fiber as needed, is opened. Subsequently, a web is obtained by carding or air laid method. A plurality of webs thus obtained are laminated and then subjected to heat treatment, to give nonwoven fabric B. By using carding method or air laid method, a web in which the thermoplastic fiber and the binder fiber are not unevenly distributed is obtained. The heat treatment can be performed at a temperature higher than the softening temperature or melting temperature of the binder component (low-melting point component) in the binder fiber and at a melting temperature of a component other than the binder component. Thus, the low-melting point component is softened or melted, which allows the thermoplastic fiber to be firmly connected, so that a laminated nonwoven fabric excellent in long-term shape retention property is obtained. The heat treatment method that may be used includes a hot air dryer, a hot air circulation type heat treatment machine, an infrared heater, and a heated roll.

The method of adjusting the basis weight and thickness of nonwoven fabric B can be determined by the feed speed in the web lamination step described above. Desired basis weight and thickness thereof can be determined by adjusting the thickness of nonwoven fabric B with a roll before the heat treatment step.

The method of bonding the skin layer and the base material layer includes a method of sandwiching a resin (e.g., polyolefin such as polypropylene) having a lower melting point than the fiber component that constitutes nonwoven fabrics A and B, in the powder form between the skin layer and the base material layer, and bonding these layers by pressing with a heating roller. It also includes a method of spraying a powdery adhesive agent onto the base material layer, further placing the skin layer thereon, and then bonding them with a heating roller.

Next, the laminated nonwoven fabric containing a skin layer and a base material layer will be described.

The laminated nonwoven fabric has preferably excellent flexibility and has a bending resistance, which is a value indicating flexibility, of preferably 300 mm or less. When the flexibility is low, interstices or wrinkles occur between a curved portion and the laminated nonwoven fabric, which tends to lower the sound absorption performance. From the above viewpoints, the bending resistance is more preferably 150 mm or more and preferably 250 mm or less.

In the case where the difference between front and back needs to be eliminated, it is also possible to provide a structure of a skin layer, intermediate layer, and skin layer in this order while the base material layer is used as an intermediate layer.

As for the sound absorption characteristics of the laminated nonwoven fabric, high sound absorption performance is obtained particularly in a low frequency range of 800 to 1250 Hz, and the average sound absorption coefficient at 800 to 1250 Hz is preferably 50% or more. In such case, the laminated nonwoven fabric is suitable to be used as a sound absorbing material against road noise by automobiles or the like.

The sound absorption coefficient in a high frequency range of 2000 to 5000 Hz is preferably 70% or more.

The laminated nonwoven fabric of the present invention is suitable for use as a sound absorbing material in applications such as automobiles, electrical equipment, and housing.

EXAMPLES

The present invention will be explained in further details hereinbelow by means of Examples, without intending to limit the present invention only to these Examples.

(1) Observation of Nonwoven Fabric Surface with Scanning Electron Microscope

A nonwoven fabric of a surface layer was observed at a magnification of 1200 times (with a scanning electron microscope (hereinafter referred to as "SEM") S-3500NH-7100FA, manufactured by Hitachi, Ltd.) to examine the surface of the nonwoven fabric.

(2) Single Fiber Diameter of Nanofiber and Number Average Single Fiber Diameter of Nanofiber At the time of the above-mentioned observation of the nonwoven fabric surface with an SEM, a photograph of the nonwoven fabric surface was taken. From this photograph, an image of a nanofiber layer portion was extracted. Using an image processing software (WinROOF), a group of 30 adjacent nanofibers was randomly extracted at 10 locations in the same photograph at a magnification of 10 times, and the single fiber diameters of a total 300 nanofibers were measured. Then, the simple average thereof was calculated to determine a number average single fiber diameter of the nanofiber.

(3) Basis Weight

The basis weight was measured in accordance with JIS L 1913(1998) 6.2.

Three test pieces of 300 mm×300 mm were taken from a specimen using a steel ruler and a razor blade. The mass of the test piece in a standard state was measured, the mass per unit area was determined by the following equation, and the average value was calculated.

$$ms = m/S$$

ms: mass per unit area (g/m$^2$)
m: average mass of test piece (g)
S: area of test piece (m$^2$)

(4) Thickness of Nonwoven Fabric A (Mm)

The thickness of nonwoven fabric A was measured in accordance with JIS L 1096 8.5.1. A thickness gauge manufactured by TECLOCK Corporation was used.

(5) Density of Nonwoven Fabric A (kg/m$^3$)

A value of basis weight/thickness was calculated to determine a mass per unit volume.

(6) Thickness of Nonwoven Fabric B (mm)

The length of the side surface in the vertical direction was measured with a metal ruler to determine a thickness (mm).

(7) Fineness

The fineness was measured in accordance with JIS L 1015(1999) 8.5.1 A method. A metallic comb was drawn through a specimen to parallel fibers. The specimen was then placed on a piece of flock paper on a cutting table. With the specimen tensioned straight by a moderate force, a gauge board was applied to the specimen, and the specimen was cut with a safety razor blade into a length of 30 mm. The fibers were counted and a set of 300 fibers was prepared. The mass of the set was then measured to determine the apparent fineness. From the apparent fineness and an equilibrium moisture regain which was separately measured, a conditioned fineness (dtex) was calculated by the following equation. Five measurements were made and the average thereof was obtained.

$$F0 = D' \times \{(100+R0)/(100+Re)\}$$

F0: conditioned fineness (dtex)
D': apparent fineness (dtex)
R0: standard moisture regain (0.4)
Re: equilibrium moisture regain (8) Fiber Length The fiber length was measured in accordance with JIS L 1015(1999) 8.4.1 A method. A specimen was paralleled with a metallic comb. A staple diagram having a width of about 25 cm was prepared using a paired sorter. For this preparation, the number of grip-and-pull cycle of nonwoven fabric was repeated about 70 times to arrange all fibers aligned on a velvet sheet. A scaled celluloid plate was placed on this, and a diagram was prepared on a piece of graph paper. A staple diagram thus prepared was divided equally into 50 portions according to fiber length, and the fiber length was measured at each boundary between these portions as well at both edges of the diagram, followed by adding the average of the fiber length at the edges to the 49 boundary fiber length measurement dividing the sum by 50 to calculate the average fiber length (mm).

(9) Tensile Strength, Elongation Degree

The tensile strength and elongation degree were measured in accordance with JIS L 1015(1999) 8.7.1. A sheet of paper having a length of 30 mm was prepared and a dividing line was drawn in the width direction of the paper 5 mm from both edge portions in the length direction of the paper. Further, a dividing line was drawn in the length direction of the paper at an interval of 5 mm in the width direction of the paper. With a space distance of 20 mm, fibers were extended loosely, each along a dividing line in the length direction and both ends fixed to paper piece with an adhesive, and each division was used as a specimen. A specimen was attached to clamps of a tensile testing machine and the paper piece was cut near the upper clamp, followed by carrying out tensile test with a clamp interval of 20 mm and tension speed of 20 mm/min and measuring the load (N) and elongation (mm). The tensile strength (cN/dtex) and elongation degree (%) were calculated by the following equation.

$$Tb = SD/F0$$

Tb: tensile strength (cN/dtex)
SD: load (cN) at rupture (It should be noted that when the load at breakage is smaller than the maximum load, the maximum load is adopted.)
F0: conditioned fineness of specimen (dtex)

$$S = \{(E2-E1)/(L+E1)\} \times 100$$

S: elongation degree (%)
E1: relaxation (mm)
E2: elongation at breakage (mm) (It should be noted that when the load at breakage is smaller than the maximum load, elongation at maximum load is adopted.)
L: clamp distance (mm)

(10) Air Permeability

The air permeability was measured in accordance with JIS L 1096-1999 8.27.1 A method (Frazier method). Five test pieces of about 20 cm×20 cm were taken from different sites of a specimen, and the test piece was attached to one end (inlet side) of the cylinder of the Frazier tester. When attached, the test piece was placed on the cylinder, and a load of about 98 N (10 kgf) was uniformly applied from above the test piece so as to prevent air leakage at the part for holding the test piece and not to block the inlet portion. After the test piece was attached, the suction fan was adjusted with use of a rheostat so that the inclined barometer indicated 125 Pa. Based on the pressure indicated on the vertical barometer and the type of the air hole used, the amount of air that permeated the test piece ($cm^3/cm^2/s$) was obtained with use of the accompanying conversion table to calculate the average air permeability of those five test pieces.

(11) Fine Pore Size Distribution Frequency

The fine pore size distribution frequency was measured in accordance with the method specified in ASTM F316-86. As a measuring device "Perm Porometer" and as a measuring reagent "Galwick", both manufactured by Porous Materials, Inc. (USA) were used, and the measurement was performed under the conditions of a cylinder pressure of 100 kPa and the measurement mode of WET UP-DRY UP.

In the distribution in increments (steps) of 10 nm from the obtained fine pore size distribution (histogram), values of the fine pore size distribution frequency (%) in the ranges of 0 to 10 and 10 to 20 were obtained. It should be noted that the fine pore size distribution is a distribution chart in which the y axis represents a fine pore size distribution and the x axis represents a fine pore size, the x axis ranges from 0 to 100 nm, and all the frequencies in 10 nm increments sum to 100%.

(12) Average Sound Absorption Coefficient

The normal incidence sound absorption coefficient was measured in accordance with JIS A 1405:1998.

Three circular test pieces having a diameter of 90 mm were taken from a specimen.

As the testing machine, an automatic normal incidence sound absorption coefficient measuring instrument (type: 10041A) manufactured by Japan Electronic Instruments Co., Ltd. was used. The test piece was positioned on one end of the impedance tube such that there was no air layer between the metal reflection plate and the test piece. Then, sound waves in a frequency band of 100 to 5000 Hz were gradually made incident perpendicular to the test piece, and as for the plane waves at the frequencies, the ratio of the acoustic power that entered into the test piece (i.e., not returned) to the incident acoustic power was measured to determine a sound absorption coefficient. The sound absorption coefficient was measured at three points of 800, 1000, and 1250 Hz, and the average of the obtained values was determined as an average sound absorption coefficient.

(13) Bending Resistance

According to A method (45° Cantilever method) specified in JIS L 1096(8.19.1) (2010), the bending resistancees in an optional direction of the laminated nonwoven fabric and a direction perpendicular to the optional direction were measured while designated as n=5, and the bending resistance (mm) was determined from the average of 10 measured values.

Example 1

(Sea-Island Structure Fiber)

Polyamide 6 (N6) (40 parts by mass) having a melt viscosity of 212 Pa·s (262° C., shear rate of 121.6 $sec^{-1}$) and a melting point of 220° C., and poly-L-lactic acid (60 parts by mass) having a weight average molecular weight of 120,000, a melt viscosity of 30 Pa·s (240° C., shear rate of 2432 $sec^{-1}$), a melting point of 170° C., and an optical purity of 99.5% or more were separately measured and then separately fed into a twin-screw extruder kneader under the following conditions, followed by kneading at 220° C., to obtain a polymer alloy chip.

Shape of screw: equi-directional complete meshing type double thread screw

Screw: diameter 37 mm, effective 1670 mm, L/D=45.1

The length of the kneading portion was 28% of the effective screw length.

The kneading portion was arranged from one-third of the effective screw length toward the discharge side.

Three backflow portions existed in the middle.

Bent: 2 places

The polymer alloy chip thus obtained was fed into a single-screw extruder melting machine of a staple spinning machine, and melt spinning was performed at a melting temperature of 235° C., a spinning temperature of 235° C. (a spinneret surface temperature of 220° C.), and a spinning speed of 1200 m/min, to obtain a fiber made of polymer alloy. This fiber was coalesced and thereafter subjected to steam drawing, to thereby obtain a tow having a single yarn fineness of 3.6 dtex.

The tow made of the polymer alloy fiber mentioned above was crimped (12 crimps/25 mm) and thereafter, the crimped tow was cut into a 51 mm staple fiber. The tensile strength thus obtained was 3.0 cN/dtex and the elongation degree was 40%.

(Skin Layer)

Next, 60 $g/m^2$ of a sea-island structure fiber and 60 $g/m^2$ of a polyethylene terephthalate staple fiber ("Tetoron" (registered trademark) manufactured by Toray Industries, Inc.) having an average fiber length of 51 mm and a single yarn fineness of 2.2 dtex were opened by carding so as to form a two-layer structure, and the opened fibers were thereafter made into a web by a crosslap webber. The web was then processed with a water-jet punching machine to thereby obtain a nonwoven fabric having a basis weight of 120 $g/m^2$ and a thickness of 0.8 mm.

Next, the nonwoven fabric mentioned above was treated with a 1% aqueous sodium hydroxide solution at a temperature of 95° C. and a bath ratio of 1:40 to thereby remove polylactic acid as the sea component, so that a nonwoven fabric 1 having a basis weight of 74 $g/m^2$ and a thickness of 0.4 mm, composed of an N6 nanofiber and a polyethylene terephthalate yarn having a single fiber diameter of 100 to 250 nm and an average fiber diameter of 150 nm was obtained.

Further, 5 $g/m^2$ of a low-melting point powder was put on the rear surface of nonwoven fabric 1, three sheets of such nonwoven fabric 1 were layered and then bonded to one another with a heating roll at 130° C., to thereby obtain a nonwoven fabric A. Nonwoven fabric A had a thickness of 1.2 mm, a density of 185 $kg/m^3$, and an air permeability of 21 $cm^3/cm^2/s$. The ratio of the nanofiber in the skin layer was 29% by mass. This nonwoven fabric A was determined as a skin layer.

(Base Material Layer)

As thermoplastic fibers, 15 parts by mass of a polyethylene terephthalate staple fiber ("Tetoron" (registered trademark) manufactured by Toray Industries, Inc.) having an average fiber length of 35 mm and a single yarn fineness of 0.8 dtex, and 15 parts by mass of a hollow polyethylene terephthalate staple fiber ("Tetoron" (registered trademark) manufactured by Toray Industries, Inc.) having an average fiber length of 51 mm and a single yarn fineness of 6.6 dtex, 55 parts by mass of a polyethylene terephthalate staple fiber ("Tetoron" (registered trademark) manufactured by Toray Industries, Inc.) having an average fiber length of 51 mm and a single yarn fineness of 2.2 dtex, and as a binder fiber, 15 parts by mass of a core-sheath type conjugate fiber (sheath component: low-melting point polyethylene terephthalate (melting point of 110° C.); core component: homopolyethylene terephthalate (melting point of 255° C.); sheath ratio: 50% by mass, "SAFMET" (registered trademark) T9611 manufactured by Toray Industries, Inc.) of a polyethylene terephthalate staple fiber having an average fiber length of 51 mm and a single yarn fineness of 2.2 dtex were blended.

These fibers were blended and opened with a carding machine to form a uniform web. The web was subsequently laminated so as to have a predetermined thickness. While the laminated web was pressed with a pressing roll so as to have a thickness of 20 mm, the fibers in the web were thermally melt-bonded in a heat treating furnace at 215° C. having upper and lower net conveyors, and the bonded fiber web was adjusted so as to have a basis weight of 400 g/m$^2$ and a thickness of 20 mm, to thereby obtain a nonwoven fabric B. This nonwoven fabric B was determined as a base material layer.

(Laminated Nonwoven Fabric)

The skin layer (nonwoven fabric A) prepared above was laminated on nonwoven fabric B taken out from the heating furnace so that the surface having the low-melting point powder faced the nonwoven fabric side, and the laminated layer was pressed with a heating roller at 130° C. to melt the low-melting point powder to thereby obtain a laminated nonwoven fabric where the skin layer and the base material layer were bonded.

The laminated nonwoven fabric thus obtained had a bending resistance of 220 nm and an average sound absorption coefficient of 71%, having superior sound absorption properties and flexibility.

Example 2

(Skin Layer)

The skin layer was prepared in the same manner as in Example 1 except that four sheets of nonwoven fabric 1 of Example 1 were bonded to one another, so that nonwoven fabric A was obtained. Nonwoven fabric A had a thickness of 1.6 mm, a density of 185 kg/m$^3$, and an air permeability of 16 cm$^3$/cm$^2$/s. This nonwoven fabric A was determined as a skin layer.

(Base Material Layer)

The same nonwoven fabric B as in Example 1 was used. This nonwoven fabric B was determined as a base material layer.

(Laminated Nonwoven Fabric)

The same bonding method as in Example 1 was used to obtain a laminated nonwoven fabric.

The laminated nonwoven fabric thus obtained had a bending resistance of 210 mm and an average sound absorption coefficient of 77%, having superior sound absorption properties and flexibility.

Example 3

(Skin Layer)

A split composite type staple fiber (single yarn fineness of 3.3 dtex, length of 51 mm) in which a polyamide 6 region and a plurality of polyethylene terephthalate regions were continuously aligned in the length direction was opened by carding, and the opened fibers were thereafter made into a web by a crosslap webber. The web was then processed with a water-jet punching machine to thereby obtain a nonwoven fabric A having a thickness of 0.5 mm, a density of 260 kg/m$^3$, an air permeability of 10 cm$^3$/cm$^2$/s, a single fiber diameter of 1800 to 2300 nm, and an average fiber diameter of 2000 nm. This nonwoven fabric A was determined as a skin layer.

(Base Material Layer)

The same nonwoven fabric B as in Example 1 was used. This nonwoven fabric B was determined as a base material layer.

(Laminated Nonwoven Fabric)

The same bonding method as in Example 1 was used to obtain a laminated nonwoven fabric.

The laminated nonwoven fabric thus obtained had a bending resistance of 250 mm and an average sound absorption coefficient of 78%, but had relatively low sound absorption coefficient at high frequencies in terms of sound absorption properties.

Example 4

(Skin Layer)

On the nonwoven fabric A used in Example 3 was put 5 g/m$^2$ of a low-melting point powder, two sheets of such nonwoven fabric A were layered and then bonded to each other with a heating roll at 130° C., to thereby obtain a nonwoven fabric A. The nonwoven fabric A thus obtained had a thickness of 1.0 mm, a density of 260 kg/m$^3$, and an air permeability of 5 cm$^3$/cm$^2$/s. This nonwoven fabric A was determined as a skin layer.

(Base Material Layer)

The same nonwoven fabric B as in Example 1 was used. This nonwoven fabric B was determined as a base material layer.

(Laminated Nonwoven Fabric)

The same bonding method as in Example 1 was used to obtain a laminated nonwoven fabric.

The laminated nonwoven fabric thus obtained had a bending resistance of 290 mm and an average sound absorption coefficient of 91%, but had relatively low sound absorption coefficient at high frequencies in terms of sound absorption properties.

Example 5

(Skin Layer)

The same nonwoven fabric A as in Example 1 was used. This nonwoven fabric A was determined as a skin layer.

(Base Material Layer)

As thermoplastic fibers, 15 parts by mass of a polyethylene terephthalate staple fiber ("Tetoron" (registered trademark) manufactured by Toray Industries, Inc.) having an average fiber length of 35 mm and a single yarn fineness of 0.8 dtex, and 15 parts by mass of a hollow polyethylene terephthalate staple fiber ("Tetoron" (registered trademark) manufactured by Toray Industries, Inc.) having an average fiber length of 51 mm and a single yarn fineness of 6.6 dtex, 55 parts by mass of a polyethylene terephthalate staple fiber ("Tetoron" (registered trademark) manufactured by Toray Industries, Inc.) having an average fiber length of 51 mm and a single yarn fineness of 2.2 dtex, and as a binder fiber, 35 parts by mass of a core-sheath type conjugate fiber (sheath component: low-melting point polyethylene terephthalate (melting point of 110° C.); core component: homopolyethylene terephthalate (melting point of 255° C.); sheath ratio: 30% by mass, "SAFMET" (registered trademark) T9611 manufactured by Toray Industries, Inc.) of a polyethylene terephthalate staple fiber having an average fiber length of 51 mm and a single yarn fineness of 2.2 dtex were blended.

These fibers were blended and opened with a carding machine to form a uniform web. The web was subsequently laminated so as to have a predetermined thickness. While the laminated web was pressed with a pressing roll so as to have a thickness of 20 mm, the fibers in the web were thermally melt-bonded in a heat treating furnace at 215° C. having upper and lower net conveyors, and the bonded fiber web was adjusted so as to have a basis weight of 400 g/m$^2$ and a thickness of 20 mm, to thereby obtain a nonwoven fabric B. This nonwoven fabric B was determined as a base material layer.

(Laminated Nonwoven Fabric)

The skin layer (nonwoven fabric A) prepared above was laminated on the nonwoven fabric taken out from the heating furnace so that the surface having the low-melting point powder faced the nonwoven fabric side, and the laminated layer was pressed with a heating roller at 130° C. to melt the low-melting point powder to thereby obtain a laminated nonwoven fabric where the skin layer and the base material layer were bonded.

The laminated nonwoven fabric thus obtained had a bending resistance of 350 nm and an average sound absorption coefficient of 68%. Although the sound absorption coefficient was excellent at both low and high frequencies, this laminated nonwoven fabric was rigid, having relatively poor flexibility because of having higher bending resistance than the laminated nonwoven fabric of Example 1. The sound absorption properties were, however, good.

Example 6

(Skin Layer)

Next, 180 g/m$^2$ of a sea-island structure fiber and 180 g/m$^2$ of a polyethylene terephthalate staple fiber ("Tetoron" (registered trademark) manufactured by Toray Industries, Inc.) having an average fiber length of 51 mm and a single yarn fineness of 2.2 dtex were opened by carding so as to form a two-layer structure, and the opened fibers were thereafter made into a web by a crosslap webber. The web was then processed with a needle punching machine to thereby obtain a nonwoven fabric having a basis weight of 360 g/m$^2$ and a thickness of 0.8 mm.

Next, the nonwoven fabric mentioned above was treated with a 1% aqueous sodium hydroxide solution at a temperature of 95° C. and a bath ratio of 1:40 (mass ratio) to thereby remove polylactic acid as the sea component, so that a nonwoven fabric 1 having a basis weight of 252 g/m$^2$ and a thickness of 1.8 mm, composed of an N6 nanofiber and a polyethylene terephthalate yarn having a single fiber diameter of 100 to 250 nm and an average fiber diameter of 150 nm was obtained.

(Laminated Nonwoven Fabric)

The same bonding method as in Example 1 was used to obtain a laminated nonwoven fabric.

The laminated nonwoven fabric thus obtained had a bending resistance of 200 mm and an average sound absorption coefficient of 71%, having very good sound absorption properties and flexibility.

Example 7

(Skin Layer)

A commercially available spunbond nonwoven fabric (Part No. G2260-1S, manufactured by Toray Industries, Inc.) having a single yarn fineness of 2.2 dtex was used.

(Laminated Nonwoven Fabric)

The same bonding method as in Example 1 was used to obtain a laminated nonwoven fabric.

The laminated nonwoven fabric thus obtained was so rigid that the bending resistance could not be measured. It had an average sound absorption coefficient of 71%, but had relatively low sound absorption coefficient at high frequencies in terms of sound absorption properties.

Comparative Example 1

(Skin Layer)

Nonwoven fabric 1 of Example 1 was used. Nonwoven fabric 1 had a thickness of 0.4 mm, a density of 185 kg/m$^3$, and an air permeability of 64 cm$^3$/cm$^2$/s. This nonwoven fabric 1 was determined as nonwoven fabric A as well as a skin layer.

(Base Material Layer)

The same nonwoven fabric B as in Example 1 was used. This nonwoven fabric B was determined as a base material layer.

(Laminated Nonwoven Fabric)

The same bonding method as in Example 1 was used to obtain a laminated nonwoven fabric.

The laminated nonwoven fabric thus obtained had a bending resistance of 230 mm and an average sound absorption coefficient of 41%, having low sound absorption coefficient at low frequencies in terms of sound absorption properties.

Comparative Example 2

(Skin Layer)

A polyethylene terephthalate staple fiber ("Tetoron" (registered trademark) manufactured by Toray Industries, Inc.) having a single yarn fineness of 2.2 dtex and a fiber length of 51 mm was opened by carding and the opened fiber was thereafter made into a web by a crosslap webber. The web was then processed with a needle punching machine to thereby obtain a nonwoven fabric A having a thickness of 2.9 mm, a density of 69 kg/m$^3$, and an air permeability of 142 cm$^3$/cm$^2$/s. This nonwoven fabric A was determined as a skin layer.

(Base Material Layer)

The same nonwoven fabric B as in Example 1 was used. This nonwoven fabric B was determined as a base material layer.

(Laminated Nonwoven Fabric)

The same bonding method as in Example 1 was used to obtain a laminated nonwoven fabric.

The laminated nonwoven fabric thus obtained had a bending resistance of 170 run and an average sound absorption coefficient of 38%, having poor sound absorption coefficient at low frequencies in terms of sound absorption properties.

Comparative Example 3

(Skin Layer)

A polyethylene terephthalate staple fiber ("Tetoron" (registered trademark) manufactured by Toray Industries, Inc.) having a single yarn fineness of 3.3 dtex and a fiber length of 51 mm was opened by carding and the opened fiber was thereafter made into a web by a crosslap webber. The web was then processed with a needle punching machine to thereby obtain a nonwoven fabric A having a thickness of 1.2 mm, a density of 125 kg/m$^3$, and an air permeability of 200 cm$^3$/cm$^2$/s. This nonwoven fabric A was determined as a skin layer.

(Base Material Layer)

The same nonwoven fabric B as in Example 1 was used. This nonwoven fabric B was determined as a base material layer.

(Laminated Nonwoven Fabric)

The same bonding method as in Example 1 was used to obtain a laminated nonwoven fabric.

The laminated nonwoven fabric thus obtained had a bending resistance of 150 mm and an average sound absorption coefficient of 21%, having poor sound absorption coefficient at low frequencies in terms of sound absorption properties.

The constitution and evaluation results of the laminated nonwoven fabric of Examples 1 to 5 were summarized in Table 1, those of Examples 6 and 7 and Comparative Examples 1 to 3 were summarized in Table 2.

TABLE 1

|  |  | Example 1 | Example 2 | Example 3 | Example 4 | Example 5 |
|---|---|---|---|---|---|---|
| Nonwoven fabric A | Basis weight (g/m$^2$) | 222 | 296 | 130 | 260 | 222 |
|  | Thickness (mm) | 1.2 | 1.6 | 0.5 | 1.0 | 1.2 |
|  | Density (kg/m$^3$) | 185 | 185 | 260 | 260 | 185 |
|  | Air permeability (cm$^3$/cm$^2$/s) | 21 | 16 | 10 | 5 | 21 |
|  | Nanofiber ratio (mass %) | 29 | 29 | 100 | 100 | 29 |
|  | Fine pore size distribution frequency 0-10 μm | 10 | 7 | 8 | 90 | 10 |
|  | Fine pore size distribution frequency 10-20 μm | 27 | 48 | 40 | 5 | 27 |
| Nonwoven fabric B | Basis weight (g/m$^2$) | 400 | 400 | 400 | 400 | 400 |
|  | Thickness (mm) | 20 | 20 | 20 | 20 | 20 |
|  | Binder fiber (mass %) | 15 | 15 | 15 | 15 | 35 |
| Stiffness of laminated nonwoven fabric (mm) |  | 220 | 210 | 250 | 290 | 350 |
| Sound absorption coefficient (%) at low frequencies | 800 Hz | 60 | 66 | 57 | 81 | 58 |
|  | 1000 Hz | 74 | 79 | 80 | 97 | 71 |
|  | 1250 Hz | 80 | 86 | 96 | 95 | 76 |
|  | Average sound absorptioin coefficient | 71 | 77 | 78 | 91 | 68 |
| Sound absorption coefficient (%) at high frequencies | 2000 Hz | 96 | 95 | 98 | 67 | 93 |
|  | 5000 Hz | 90 | 92 | 62 | 50 | 90 |

TABLE 2

|  |  | Example 6 | Example 7 | Comparative Example 1 | Comparative Example 2 | Comparative Example 3 |
|---|---|---|---|---|---|---|
| Nonwoven fabric A | Basis weight (g/m$^2$) | 252 | 260 | 74 | 200 | 150 |
|  | Thickness (mm) | 1.8 | 0.6 | 0.4 | 2.9 | 1.2 |
|  | Density (kg/m$^3$) | 140 | 433 | 185 | 69 | 125 |
|  | Air permeability (cm$^3$/cm$^2$/s) | 27 | 11 | 64 | 142 | 200 |
|  | Nanofiber ratio (mass %) | 29 | 0 | 29 | 0 | 0 |
|  | Fine pore size distribution frequency 0-10 μm | 7 | 35 | 0 | 0 | 0 |
|  | Fine pore size distribution frequency 10-20 μm | 42 | 53 | 22 | 8 | 6 |
| Nonwoven fabric B | Basis weight (g/m$^2$) | 400 | 400 | 400 | 400 | 400 |
|  | Thickness (mm) | 20 | 20 | 20 | 20 | 20 |
|  | Binder fiber (mass %) | 15 | 15 | 15 | 15 | 15 |
| Stiffness of laminated nonwoven fabric (mm) |  | 200 | Not measured | 230 | 170 | 150 |
| Sound absorption coefficient (%) at low frequencies | 800 Hz | 57 | 56 | 30 | 30 | 20 |
|  | 1000 Hz | 72 | 76 | 41 | 38 | 21 |
|  | 1250 Hz | 34 | 82 | 52 | 46 | 23 |
|  | Average sound absorptioin coefficient | 71 | 71 | 41 | 38 | 21 |
| Sound absorption coefficient (%) at high frequencies | 2000 Hz | 96 | 95 | 91 | 73 | 51 |
|  | 5000 Hz | 93 | 62 | 90 | 80 | 72 |

The invention claimed is:

1. A laminated nonwoven fabric having a skin layer and a base material layer,
   the skin layer having a nonwoven fabric A, the nonwoven fabric A having a density of 100 to 500 kg/m$^3$, a thickness of 0.5 to 2.5 mm, and an air permeability of 4 to 40 cm$^3$/cm$^2$/s, wherein the nonwoven fabric is constituted by laminating a nanofiber layer and a layer of fibers thicker than nanofibers; and
   the base material layer having a nonwoven fabric B, the nonwoven fabric B having a basis weight of 200 to 500 g/m$^2$ and a thickness of 5 to 40 mm,
   wherein the nonwoven fabric A has a pore diameter dispersion degree of 1 to 20 in the range of the fine pore size distribution frequency exceeding 0 to 10 nm or less, and a pore diameter dispersion degree of 15 to 60 in the range of 10 to 20 nm, and
   wherein the nonwoven fabric B contains a crimped thermoplastic fiber.

2. The laminated nonwoven fabric according to claim 1, wherein the nonwoven fabric B has a thickness of 10 to 40 mm.

3. The laminated nonwoven fabric according to claim 1, wherein the nonwoven fabric A comprises 20 to 40% by mass of a thermoplastic fiber having a single fiber diameter of 1 to 5000 nm, relative to the whole nonwoven fabric A.

4. The laminated nonwoven fabric according to claim 1, wherein the nonwoven fabric A comprises 20 to 40% by mass of a thermoplastic fiber having a single fiber diameter of 1 to 700 nm, relative to the whole nonwoven fabric A, and
   the nonwoven fabric constituted by laminating a layer having a fiber with a single fiber diameter of 1 to 700 nm and another layer having a fiber with a single fiber diameter of more than 5000 nm.

5. The laminated nonwoven fabric according to claim 1, having a bending resistance of 300 mm or less.

6. The laminated nonwoven fabric according to claim 1, wherein the nonwoven fabric A has fibers made of polyamide and/or fibers made of polyethylene terephthalate.

7. The laminated nonwoven fabric according to claim 1, wherein the nonwoven fabric B has a binder fiber and the content of the binder fiber is 5 to 30% by mass relative to the whole nonwoven fabric B.

8. A sound absorbing material comprising the laminated nonwoven fabric defined in claim 1.

* * * * *